Aug. 28, 1962 R. K. YORK 3,051,845

GATE CIRCUIT

Filed Dec. 21, 1959

INVENTOR
R. K. YORK
BY Kenneth B. Hamlin
ATTORNEY

United States Patent Office 3,051,845

Patented Aug. 28, 1962

3,051,845

GATE CIRCUIT

Robert K. York, New Brunswick, N.J., assignor to Bell Telephone Laboratories, Incorporated, New York, N.Y., a corporation of New York Filed Dec. 21, 1959, Ser. No. 860,814
12 Claims. (Cl. 307—88)

This invention relates generally to magnetic gating circuits and more particularly to such circuits capable of performing logical operations as well as gating information from one or more of a plurality of input sources to a common output circuit.

Gating circuits which perform signal gating and switching as well as logical "AND" or "OR" operations are known in the art and are often referred to as selector and connector circuits. One use for which gating circuits are particularly suited is in information handling systems such as employed in the routing of telephone messages. The cost of manufacture and maintenance of such systems is directly dependent upon the characteristics of the component elements, and specifically upon the incidence of failure, power consumption, durability, and relative size of the gating circuits employed therein. It is apparent that the desirable characteristics of a gating circuit are low incidence of failure, low power consumption, durability, simplicity, and compactness of size.

Some of the types of gating circuits known in the art utilize electromechanical relays, vacuum tubes, asymmetrical devices, and semiconductor devices such as transistors and four layer diodes. These gating circuits are characterized by varying degrees of reliability, size, and relative power requirements. In present practice a desired degree of reliability is often attained by multiplying a number of the component elements. For example, a plurality of transistors may be utilized where only one is necessary in order that there will always be a standby in case of a failure. Consequently such gates are complex, expensive, wasteful, and are not sufficiently reliable without undue multiplicity.

A substantial gain of reliability is attained by using magnetic gating circuits. The magnetic gates presently known generally have a two-state or "hard magnetic" material member utilized therein. "Hard magnetic" materials exhibit essentially a square loop hysteresis characteristic. As distinguished from "hard magnetic," the term "soft magnetic," as used hereinafter, is to be understood to refer to any material having the characteristics of high initial permeability and low remanent magnetic flux and thus substantially a non-square hysteresis loop. Although magnetic gates utilizing "hard magnetic" material have attained a high degree of reliability, they are characterized by other disadvantages. One such disadvantage is that they consume considerable electrical power during the entire operation. Another distinct disadvantage is that they cannot effectively gate input signals of small magnitudes.

Therefore, it is a principal object of this invention to provide an improved magnetic gating circuit. More specifically, it is an object of my invention to provide such a gating circuit having substantial reliability, which can advantageously be manufactured economically, and wherein input signals of relatively small magnitude can be efficiently gated without distortion.

Additional objects of this invention are to reduce the relative size, the complexity, the incidence of failure, the cost of manufacture, and the cost of maintenance of gating circuits.

Further objects of this invention are to increase the utility of such circuits by increasing their durability and expected life.

It is an additional object of this invention to reduce or substantially eliminate the occurrence of spurious output signals in such gating circuits.

These and other objects of my invention are attained in an illustrative embodiment thereof which comprises a plurality of gating units or gates each including three transformers, namely, an input transformer $T_A$, a cancellation transformer $T_B$, and an output transformer $T_C$. A first or input winding of the input and cancellation transformers $T_A$ and $T_B$ of each gate unit are serially connected to an individual output terminal of an information source, which terminal is independent of the terminals connected to the other gating units. A first winding on the output transformer $T_C$ of each gating unit is serially connected with the first windings on the output transformers of each other gating unit, and this series arrangement is connected to a common output terminal connected to the common output circuit to which it is desired to gate the information appearing at the various independent output terminals of the information source.

In accordance with an aspect of my invention, a second winding on each of the transformers $T_A$, $T_B$, and $T_C$ of each gating unit is connected in series, and this series arrangement of second windings of each gating unit is connected in parallel with the series arrangement of second windings of all the other gating units. Accordingly, current flow through this series arrangement of second windings in one gating unit has as its return path the parallel arrangements of second windings of all the other gating units.

Disposed on the cancellation and output transformers $T_B$ and $T_C$ are third or control windings which are serially connected to each other and to which is applied a control signal from a control signal source. Each gating unit is, of course, controlled independently of each other gating unit. The gating signals are sufficient to saturate the cancellation and output transformers. The transformers advantageously include soft magnetic cores and may readily, in accordance with another aspect of my invention, all be formed on the same sheet of magnetic material.

In accordance with my invention, two cancellations of any spurious signals are obtained during normal operation of the gating circuit. The first or input windings and the second windings on the input and cancellation transformers $T_A$ and $T_B$ of each gating unit are arranged so that there is a phase opposition of any signals or potentials induced in the second windings when the gating unit is in its Off condition. The second cancellation of spurious signals in a gating unit in the Off condition is provided by the series and parallel arrangement of the second windings of the transformers of the various gating units and the series connection of the first windings of the output transformers of the gating units. If a potential is induced or is present in the first or output windings of the output transformer of a particular gating unit, a potential of opposite phase is induced in the second winding of that output transformer. Current resulting from this induced potential then flows through the series connected second windings of that gating unit and back through a return path including the series connected second windings of each other gating unit. This return current in turn induces in the first or output windings of these other gating units a potential such that the sum of these induced potentials in the output windings of the other gating units is of the same magnitude but opposite in polarity phase to the original potential present in the output winding of the particular gating unit. As all the output windings are series connected, there is, then, in the Off condition effectively no signal present in the series connected output windings and no spurious signal is applied to the common output circuit.

When a control signal is applied to the control winding of a selected gating unit the cancellation and output transformers $T_B$ and $T_C$ are saturated, thereby leaving the input transformer $T_A$ to act in a normal way to transform the input signal applied to its input winding into a potential on its second winding. Because of the connection of the series second windings of each gating unit in parallel, the resulting current flows in parallel through the second windings of each other gating unit, inducing a potential in the output winding of its output transformer $T_C$. However, the selected gating unit output transformer is saturated by the control signal so that no output signal can be induced in its output winding. Accordingly, an output signal appears at the common output terminal, which is the sum of the output signals induced in the series connected output windings of the other gating units.

In another embodiment of my invention, a fourth transformer is employed in each gating unit. This fourth transformer has only a control winding and an output winding. The control winding is connected in series with the control windings of the cancellation and output transformers $T_B$ and $T_C$, and the output winding is connected in series with its associated output winding and the output windings of all of the output and fourth transformers of the other gating units. In accordance with this embodiment, there is obtained a further substantial reduction of any potential that may be induced in the output winding of the output transformer when its control winding is energized to saturate the output transformer during a gating operation.

It is a feature of this invention that a gating circuit comprise a plurality of gating units each including a plurality of transformers with their windings so connected that the input signal applied to a particular gating unit is gated to the common output circuit by output currents induced in the output transformers of all the gating units but the one to which the input signal is applied.

It is another feature of my invention that each gating unit include at least three transformers, to a first and a second of which the input signals are applied and to the second and a third of which saturating control signals are applied, the second transformer thus serving to cancel error signals in the first or input transformer when gating control signals are not applied and also serving to separate the input and output functions of each gating unit.

It is a further feature of my invention that a winding on each of the three transformers of each gating unit be serially connected, with the serially connected windings of each gating unit connected in parallel.

It is an additional feature of my invention that in each gating unit control windings be placed on a transformer common to an input winding and a transformer common to an output winding and be energized to saturate their respective transformers to effect the gating operation.

It is a still further feature of my invention that the output winding on each output transformer be connected in series to the common output circuit, the output windings and the second windings of the transformers being so arranged that any potential induced in one output winding is substantially canceled by the sum of the resulting potentials induced in the series connected other output windings due to the parallel connection of the series connected second windings.

It is still a further feature of my invention that a single sheet of soft magnetic material having a plurality of apertures therein be utilized to define the cores for all the transformers of the gating circuit.

It is still another feature of one specific embodiment of my invention that a control and an output winding be included on a fourth transformer connected to each gating unit so as substantially to reduce any potential induced into the output winding of a gating unit when its control windings are energized.

A complete understanding of these and other objects and features of my invention may be gained from consideration of the following detailed description of an illustrative embodiment thereof when read with reference to the accompanying drawing, in which:

FIG. 2 is illustrative of the magnetic sheet structure utilized as a common core member of all the transformers and shows an illustrative placement of the various apertures therein to define the individual cores for each of the plurality of transformers;

FIG. 3 is illustrative of one aspect of this invention and shows the wired diagram of one gating unit as illustrated in FIG. 1 disposed on the magnetic sheet structure of FIG. 2; and FIG. 4 is illustrative of another embodiment of this invention wherein an additional transformer is utilized to reduce the control transient current in the output winding of each gating unit.

Figure 1:
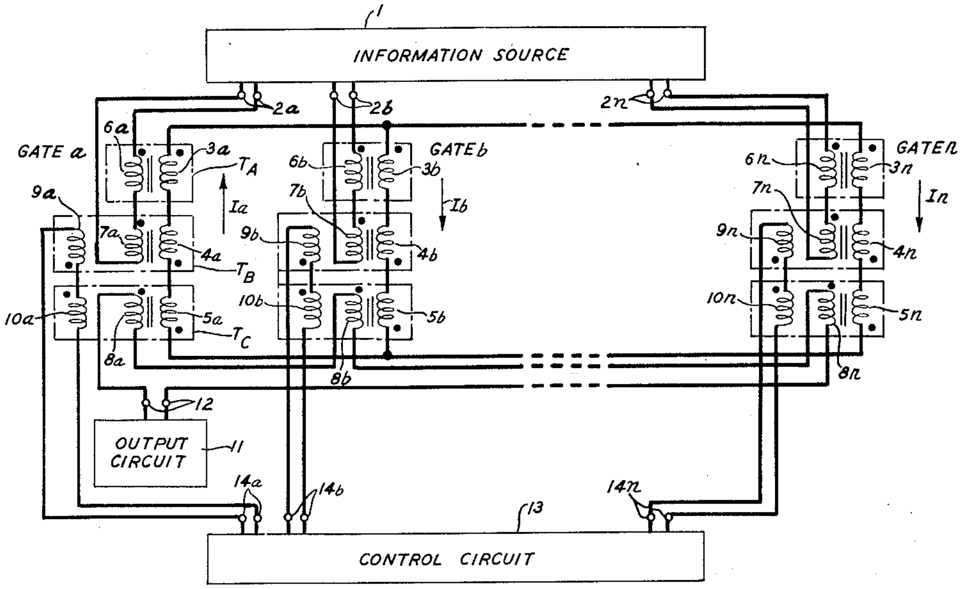
FIG. 1 is a schematic representation of one illustrative embodiment of this invention.
Figure 1:
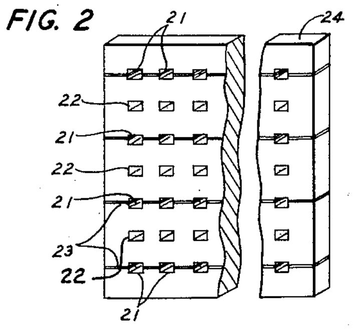
Figure 1:
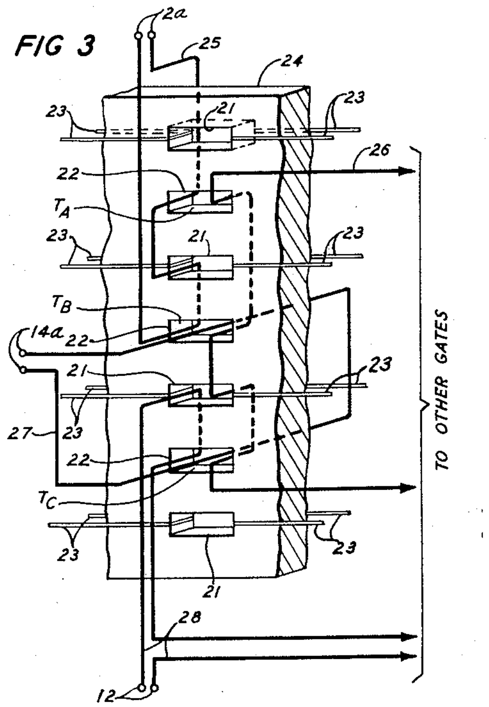
Figure 1:
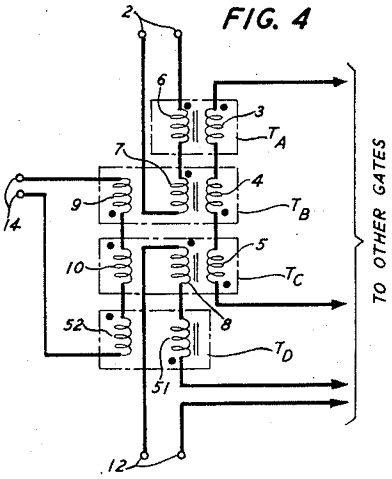

Referring more particularly to the drawings, FIG. 1 shows an illustrative embodiment of a gating circuit in accordance with the invention which comprises a plurality of gating units or gates designated gate *a*, gate *b* . . . gate *n*, each of which includes three transformers $T_A$, $T_B$, and $T_C$. The input transformer $T_A$ of each gate has a first or input winding 6 and a second winding 3; the cancellation transformer $T_B$ of each gate has a first or input winding 7, a control winding 9, and a second winding 4; and the output transformer $T_C$ of each gate has a control winding 10, an output winding 8 and a second winding 5, all connected as shown. Each gating unit or gate has a pair of independent input terminals 2 at the output of information source 1 and a corresponding pair of independent control terminals 14 at the output of control circuit 13. The gating of desired information from a selected pair of input terminals such as 2*a* associated with gate *a* to the output circuit 11 through output terminals 12 common to all gates is accomplished by selectively applying a control signal pulse to the corresponding control terminals 14*a* associated with gate *a*.

All of the gates are similarly constructed and a detailed description of one gate will sufficiently describe the remaining gates; accordingly, only gate *a* will be described in detail. The input windings 6*a* and 7*a* of the input and cancellation transformers $T_A$ and $T_B$, respectively, are serially connected to each other and terminate at terminals 2*a* of information source 1. Source 1 supplies the information to be selectively gated to the common output circuit 11.

Information source 1 may, for example, be a storage matrix wherein information is stored by the presence or absence of capacitive coupling between coordinate row and column leads of the matrix, such as disclosed in the copending applications of E. R. Kretzmer, Serial No 816,451, and W. J. Means, Serial No. 816,550, both filed on May 28, 1959, and in D. H. MacPherson U.S. Patent No. 3,011,156, of November 28, 1961. Specifically, the gating circuit of my invention may advantageously be connected to the column leads of one coordinate of a three dimensional capacitive storage matrix and other similar gating circuits connected to the column leads of other coordinates of the three dimensional matrix so that information stored in the matrix may be gated out on a word organized basis.

Returning again to the description of gate *a*, the control windings 9*a* and 10*a* of the cancellation and output transformers $T_B$ and $T_C$, respectively, are serially connected to each other and terminate at terminal 14*a* on control circuit 13. When windings 9*a* and 10*a* are energized by a control pulse from control circuit 13 during a gating operation, sufficient flux is generated in these windings to saturate the cores of transformers $T_B$ and $T_C$.

The control circuit 13 selectively applies an electrical pulse to the terminals 14 associated with the gate whose input windings 6 and 7 carry the information desired to be gated from the information source 1 to the output circuit 11. Any pulse source of a type known in the art can be employed in control circuit 13.

Output transformer $T_C$ of gate *a* has an output winding 8*a* which is connected in series with the output windings 8 of the other gates *b* . . . *n* to terminals 12 of output circuit 11 in the manner shown.

Transformers $T_A$, $T_B$ and $T_C$ of gate *a* have second windings 3*a*, 4*a* and 5*a* respectively, which windings are serially connected to each other with the second windings 3*a* and 4*a* of transformers $T_A$ and $T_B$ connected in phase opposition. In this illustrative embodiment the phase relationship of the potentials induced in the plurality of windings is shown using conventional dot symbols. It is to be understood, however, that specific winding arrangements are illustrative and are not intended to limit the manner of connecting the plurality of windings to that shown. The set of serially connected second windings of gate *a* are connected in parallel to the similar sets of series connected second windings of the other plurality of gates *b* . . . *n*.

When transformers $T_A$ and $T_B$ of gate *a* are in a normal condition, that is unsaturated, any input signal present on input windings 6*a* and 7*a* will induce potentials into the second windings 3*a* and 4*a* respectively which are of equal magnitude and opposite polarity thus causing substantial cancellation of the currents caused by the induced potentials. If, however, due to some transformer unbalance between transformers $T_A$ and $T_B$, a slight induced potential results in the series connected second winding set of gate *a*, current designated for illustrative purposes in FIG. 1 as current $I_a$ will flow in the series connected second winding set of gate *a*. This current induces a potential in the output winding 8*a* of gate *a*. However, due to the particular arrangement of the transformer windings there will be, in accordance with my invention, a substantial cancellation of any signal that might be present in the series connected output windings of all gate circuits when the gating circuit of my invention is in the Off or normal condition.

In the Off or normal condition of gate *a*, input information from source 1 is applied to input windings 6*a* and 7*a*. In this state, control windings 9*a* and 10*a* are not energized and transformers $T_A$ and $T_B$ are acting as normal transformers with the input signal on the input windings 6*a* and 7*a* being transformed into potentials in the second windings 3*a* and 4*a* where they substantially cancel, as indicated above, due to the phase opposition of the windings 3*a* and 4*a*. Any current $I_a$ caused by a potential induced by an unbalance between transformers $T_A$ and $T_B$ will flow up the series connected second winding set of gate *a* and induce into output winding 8*a* a potential of a predetermined magnitude and direction. This current $I_a$ will divide and travel down the second winding sets of the other plurality of gates as shown by the arrows $I_b$ . . . $I_n$. Each of the component currents $I_b$ . . . $I_n$ will cause a potential to be induced in the output windings 8 of their respective gates causing current of a predetermined magnitude and direction to flow therein. The current flow in the output windings 8*b* . . . 8*n* add to form a total current which is equal in magnitude but opposite in direction to the current flowing in output winding 8*a* of gate *a*. Should the unbalance between transformers $T_A$ and $T_B$ be such that current $I_a$ flows in a direction opposite to that shown in FIG. 1, then the currents $I_b$ . . . $I_n$ will correspondingly be in the opposite direction to that shown. Thus it is apparent that no current will flow in the output circuit 11 when the gate *a* is in the Off or normal condition. A similar analysis with respect to the other gates *b* . . . *n* reveals that the same operation and consequent complete cancellation of any potential induced in the output windings of the respective gates occurs when these gates are in their Off or normal condition.

The actual selecting and connecting of a signal from a selected output terminal 2 of information source 1 to the output circuit 11 occurs when a selected gate *a*, *b* . . . *n* is in the On condition. Control circuit 13 appropriately selects and transmits to the control windings 9 and 10 of the selected gate an electrical pulse of appropriate magnitude. In response to this pulse the control windings of the selected gate generate sufficient flux to saturate the cores of transformers $T_B$ and $T_C$ thereof. A magnetic material is said to be in the saturation condition when the material can no longer contain any additional magnetic flux. Thus when a transformer is in a saturated condition it acts effectively as a short circuit and normal transformer action cannot take place. In this instance saturated transformers $T_B$ and $T_C$ of the selected gate act effectively as a short circuit.

Assume, for example, that it is desired to connect the information available at terminals 2*a* of information source 1 to output circuit 11. To accomplish this control circuit 13 applies a pulse to terminals 14*a* associated with gate *a* which in turn energizes control windings 9*a* and 10*a* to saturate transformers $T_B$ and $T_C$ of gate *a*. The input signal applied to input windings 6*a* and 7*a* can only be transformed into a potential in the second winding 3*a* of input transformer $T_A$ and no input is induced in the second winding 4*a* of cancellation transformer $T_B$ because, as mentioned above, transformer $T_B$ is saturated and acts as a short circuit. Hence, the first described cancellation of the Off condition due to the cancellation in transformer $T_B$ is eliminated when gate *a* is in the On condition. As hereinbefore discussed, in reference to the Off condition, any resulting potential induced in the series connected second windings 3*a*, 4*a* and 5*a* of gate *a* will cause a current $I_a$ to flow in the series connected set of second windings of gate *a*. This current $I_a$ divides into currents $I_b$ . . . $I_n$ which flow in the respective second winding sets of gates *b* . . . *n*. As in the Off condition, the various divided currents $I_b$ . . . $I_n$ will induce potentials in their respective output windings 8. These potentials combine to cause a combined current of predetermined magnitude and direction to flow in the series connected output windings 8 of all gate circuits. However, in the On condition, in accordance with my invention, no cancellation of these output signals occurs. Since the output transformer $T_C$ of gate *a* is in a saturated condition it acts as a short circuit and the current $I_a$ flowing through the second winding 5*a* cannot induce a potential into the output winding 8*a*. Thus the current flowing in the output circuit 11 will be that caused by the sum of the potentials induced in the output windings 8 of the nonselected gates *b* . . . *n*. This gated current is then applied to common output circuit 11. Thus, in accordance with an aspect of my invention, an input signal applied to a particular gate is gated to the common output circuit 11 by the sum of the output currents induced in the output windings 8 of all the gates but the one to which the input signal is applied. A similar action results when any of the other gates *b* . . . *n* is selected.

Although individual transformers with individual cores are depicted in the embodiment of the invention shown in FIG. 1, it will be appreciated that the respective transformers shown in FIG. 1 can be, in accordance with an aspect of the present invention, advantageously formed on a single sheet or plate of soft magnetic material with the cores of the respective transformers being defined by a plurality of holes or apertures in the magnetic sheet or plate. As is known in the art, a transformer can be any pair of conductors inductively coupled to each other so as to transform a potential applied in one conductor into the other conductor. Ordinary windings positioned on a toroidal core thus form transformers in a conventional sense. Equally appropriate, a single sheet or plate of magnetic material with a hole or aperture therein can be utilized as a transformer when a plurality of conductors are threaded through the hole or placed inductively adjacent thereto.

In FIG. 2 there is shown a sheet 24 of soft magnetic material with a plurality of holes or apertures positioned in columns and rows. The plurality of holes may be of arbitrary size and geometric shape and comprise two types, an active type 22 and an isolation type 21. The rows of active type holes 22 alternate with the rows of isolation type holes 21. The magnetic material surrounding the active holes 22 comprise the cores of individual transformers when electrical conductors are threaded therethrough or inductively coupled thereto as will be described. To isolate the respective cores defined by active holes 22 in each column of holes, an isolation hole 21 is placed between each active hole 22 in each column of holes. Adjacent isolation holes are connected using a shorted turn conductor 23 in the manner shown in FIGS. 2 and 3. This shorted turn conductor 23 may advantageously be etched or plated on plate 24 in the manner known in the art and offers a high reluctance path to magnetic flux to isolate effectively the active holes of each column. The columns of holes are spaced at appropriate distances to isolate effectively the active holes of each row from the other active holes in the same row. It is appreciated that column isolation could equally well be attained by alternately placing an isolation hole between each of the active holes in the rows of holes and by interconnecting adjacent isolation holes by a shorted turn conductor 23.

FIG. 3 depicts one column of holes in magnetic sheet 24 and illustrates the manner in which the embodiment of the invention shown in FIG. 1 may advantageously be formed on a single sheet of soft magnetic material. FIG. 3 shows only gate *a* of FIG. 1 as this will clearly indicate the manner of inductively coupling the various windings on the respective transformers of all gates *a*, *b* . . . *n*. The active holes 22 in sheet 24 shown in FIG. 2 are designated $T_A$, $T_B$ and $T_C$ respectively in FIG. 3 to correspond to the three transformers comprising gate *a* in the circuit of FIG. 1. The magnetic material surrounding these holes forms the cores of the individual transformers. It will be noted that the active holes defining the cores of transformers $T_A$, $T_B$ and $T_C$ are separated by isolation holes 21, each of which is linked to an adjacent row isolation hole by a shorted turn conductor 23.

Disposed inductively on sheet 24 as shown in FIG. 3 are a plurality of conductors 25, 26, 27 and 28, which conductors form the input, second, control, and output windings, respectively, of gate *a* of FIG. 1. It will be noted that conductor 25 terminates at terminals designated 2*a* which correspond to terminals 2*a* of information source 1 shown in FIG. 1. Conductor 25 extends through the active holes designated $T_A$ and $T_B$ and thus forms the input windings corresponding to input windings 6*a* and 7*a* respectively of transformers $T_A$ and $T_B$ of gate *a* in the circuit of FIG. 1. Similarly, conductor 27 terminates at terminals 14*a* which correspond to terminals 14*a* on control circuit 13 in the circuit of FIG. 1 and extends through holes $T_B$ and $T_C$ to form control windings corresponding to control windings 9*a* and 10*a* on transformers $T_B$ and $T_C$ of gate *a* in the circuit of FIG. 1. In a similar manner, conductor 26 extends through holes $T_A$, $T_B$ and $T_C$ and forms the second windings corresponding to the second windings 3*a*, 4*a* and 5*a* respectively of transformers $T_A$, $T_B$ and $T_C$ of gate *a* in the circuit of FIG. 1. Conductor 26 is connected in parallel to similar conductors which extend through holes $T_A$, $T_B$ and $T_C$ of the other gates on sheet 24. Finally, conductor 28 which terminates at terminals 12 corresponding to terminals 12 of output circuit 11 of the circuit of FIG. 1 extends through hole $T_C$ and forms the output winding corresponding to output winding 8*a* of output transformer $T_C$ of gate *a* in the circuit of FIG. 1. Conductor 28 in the manner shown in FIG. 1 extends through each of the other $T_C$ holes of the other gates mounted on sheet 24 and terminates at terminals 12.

Conductors 25 through 28 are threaded through the holes $T_A$, $T_B$ and $T_C$ of plate 24 in the manner shown in FIG. 3 to provide the polarities of potentials induced from one conductor to another corresponding to the polarities of potentials induced in the corresponding windings on transformers $T_A$, $T_B$ and $T_C$ in gate *a* of the circuit shown in FIG. 1. Thus these conductors are disposed in such a manner as to produce effectively the hereinbefore discussed two cancellations when gate *a* is in its Off condition and to gate effectively an input signal applied to terminals 2*a* of information source 1 to terminals 12 of output circuit 11 when gate *a* is placed in its On condition by an electrical pulse applied to terminals 14*a* of control circuit 13.

The cost of inductively coupling the respective conductors 25 through 28 to the magnetic plate 24 may advantageously be reduced by employing etched or printed wiring techniques known in the art. The shorted turn, second, and output windings are particularly applicable to these techniques. Referring to FIG. 3, it will be noted that the second windings formed by conductor 26 are placed on plate 24 such that there are no connections external to the plurality of gates and that conductor 28 which forms the output windings of the respective gates on the plate 24 has only two external connections at terminals 12. The number of turns conductor 25 makes through the respective holes $T_A$ and $T_B$ to form the input windings of the gate may advantageously be determined on an impedance matching basis in order to match the impedance of the gating circuit to information source 1. Advantageously, a means for matching the output impedance of the gating circuit to the load formed by output circuit 11 may be attained by providing an additional hole not shown in FIG. 3 which defines a core of an output matching transformer. The output winding can advantageously be etched or deposited through this hole and the proper number of turns added to provide output impedance matching.

Referring again to the embodiment of the present invention shown in FIG. 1, when an electrical pulse is applied to the control windings 9 and 10 of any of the gates *a*, *b* . . . *n* a slight potential may be induced into the associated output winding 8 prior to the time that the transformers $T_B$ and $T_C$ become saturated. This potential may cause a transient current in output circuit 11 which for some applications of the gating circuit of the present invention may be bothersome and disadvantageous. Further reduction or elimination of this transient current may be attained by the embodiment of my invention depicted in FIG. 4. FIG. 4 shows a typical gate circuit of the type shown in FIG. 1 wherein the three transformers $T_A$, $T_B$ and $T_C$ are those comprising a gate, such as gate *a*, in the embodiment of FIG. 1, and have the same reference numbers applied thereto. Thus the gate shown in FIG. 4 essentially comprises a gate shown in FIG. 1 to which a fourth transformer $T_D$ having a control winding 52 and an output winding 51 has been added. Control winding 52 is connected serially with control windings 9 and 10 of transformers $T_B$ and $T_C$ respectively. Output winding 51 is serially connected in phase opposition with the output winding 8 of transformer $T_C$ so that in the On condition of the gate any transient current resulting from the potential induced into the series connected output windings, when the control windings 9, 10 and 52 are energized is substantially cancelled or reduced.

It is to be understood that the specific embodiment of the invention depicted in FIG. 4 is illustrative only. An equally workable arrangement having a fourth transformer is attained by employing one fourth transformer for a plurality of gates. This arrangement may advantageously be realized by winding an output winding and control winding for each of the plurality of gates *a*, *b* . . . *n* on a core common to all of the plurality of gates.

In the Off condition the gate of FIG. 4 operates in substantially the same manner as that hereinbefore described in connection with the gate of FIG. 1. In the On condition, however, control windings 9, 10 and 52 saturate transformers $T_B$, $T_C$ and $T_D$ respectively and because the output windings 8 and 51 are connected in phase opposition any transient potential that is induced in output winding 8 of transformer $T_C$ before transformer $T_C$ is saturated will be effectively canceled by a similar transient potential of opposite polarity induced in output winding 51 of transformer $T_D$.

It is to be understood that the above-described arrangements are illustrative of the principles of the invention. Numerous other arrangements may be devised by those skilled in the art without departing from the spirit and scope of the invention.

What is claimed is:

1. An electrical circuit for gating information from a plurality of input terminals to a common output terminal, comprising a plurality of gates each including three normally unsaturated magnetic core transformers having first and second windings thereon, means connecting the second windings of said three transformers of each gate in series and connecting said series connected second windings of all of said gates in parallel, means for applying input signals from said input terminals to the first windings of said first and second transformers of an associated one of said gates such that the voltages induced in the second windings of said first and second transformers normally substantially cancel each other, means connecting the first winding of said third transformer of all of said gates in series to said common output terminal, and means for temporarily saturating said second and third transformers of a selected gate so that said input signal applied to said first transformer of said selected gate induces a signal temporarily only in said second winding of said first transformer which signal flows in parallel through said second windings of the other of said gates inducing signals in the first winding of the third transformer of said other gates which signals are additive and applied to said common output terminal.

2. An electrical circuit for gating information from a plurality of input terminals to a common output circuit comprising a plurality of gates, each of said gates including a first, a second and a third normally unsaturated magnetic core transformer, each of said transformers of each of said gates having at least first and second windings thereon, means connecting said second windings of each of said transformers in series, means for parallelly connecting said series connected second windings of all of said plurality of gates, said second winding of said first transformer being connected in phase opposition to said second winding of said second transformer in each of said gates, means connecting said first windings of said first and second transformers in each of said gates in series in the same phase to individual ones of said input terminals whereby signals induced in said second windings of said first and second transformers are normally substantially canceled, means connecting said first winding of said third transformer of all of said gates in series to said output circuit, and control means for temporarily selectively saturating said second and third transformers of each of said gates to gate a signal applied to the associated input terminal through other of said gates to said common output circuit.

3. An electrical circuit in accordance with claim 2 wherein said control means includes third windings connected in series on said second and said third transformers of each of said gates, said third windings and said first windings of said second and said third transformers of each of said gates being so related that voltages induced in said second windings on the application of saturating signals to said third windings substantially cancel each other.

4. In a gating circuit comprising a plurality of gates, each of said gates comprising three normally unsaturated transformers, one transformer of each of said gates being an output transformer and having an output winding thereon, means connecting said output windings of all of said gates in series, means for normally canceling input signals applied to said gates, means for applying control signals to a selected one of said gates to temporarily saturate at least said output transformer of said selected gate when an input signal to said selected gate is to be gated through said gating circuit, means for applying an input signal to said selected gate, and winding means for transferring said input signal from said selected gate to each of said output windings of all of said gates except said selected gate whereby said input signal is gated through said gating circuit by means of the output windings of all of said gates but said selected gate to which said input signal is applied.

5. A gating circuit comprising a plurality of gates, each of said gates including an input terminal, a control terminal, a first transformer, a second transformer and a third transformer, each of said transformers having first and second windings disposed inductively on a normally unsaturated soft magnetic core, means in each of said gates connecting said first windings of said first and second transformers in series to the input terminal thereof, means for normally canceling an input signal applied to said input terminal, said last-mentioned means including means connecting said second windings of said first and said second and said third transformers of each of said gates in series with the second windings of said first and said second transformers connected in phase opposition and means connecting said serially connected second windings of all of said gates in parallel and means connecting said first winding of said third transformer of all of said gates in series to a common output terminal, and means for temporarily disabling said normal cancellation means to gate said input signal through other of said gates to said common output terminal, said last-mentioned means including a third winding on said second and said third transformers connected in series in each of said gates to the control terminal thereof.

6. A gating circuit in accordance with claim 5 further comprising a fourth transformer in each of said gates, said fourth transformer having a first winding connected in series with said third winding on said second and said third transformers in the associated one of said gates, said fourth transformer having a second winding connected in series with said first windings of said third transformer of all of said gates.

7. An electrical circuit for selecting and transmitting one of a plurality of input signals to an output circuit comprising in combination a plurality of sources of input signals, a plurality of sets of normally unsaturated magnetic members, a plurality of first windings and a plurality of second windings, one of said first windings and one of said second windings disposed inductively on each of said magnetic members of each of said sets, means connecting said first windings associated with at least two of said members in each of said sets in series to an associated one of said sources, means for normally preventing transmission of said input signals to said output circuit, said last-mentioned means comprising means connecting each remaining one of said first windings associated with each remaining one of said members in each of said sets in series with each such remaining one of said first windings associated with each remaining one of said members in all others of said sets and means connecting the second windings associated with said members in each of said sets in series with at least two of said second windings connected in phase opposition and means connecting said serially connected second windings of all of said sets in parallel, and means for disabling said transmission prevention means including a third winding disposed inductively on all except one of said members in each of said sets for temporarily saturating the associated members to gate one of said plurality of input signals through windings on other of said sets of magnetic members to said common output circuit.

8. The combination defined in claim 7 wherein each of said magnetic members of said sets is defined by an individual aperture in a common plate of soft magnetic material and wherein said windings disposed inductively on each of said magnetic members of each of said sets comprises one or more conductors positioned in inductive relationship to the magnetic material of said plate adjacent the associated one of said apertures.

9. An electrical circuit comprising a plurality of gates, each of said gates comprising a normally unsaturated soft magnetic material defining at least three magnetic circuits, input windings positioned on one pair of said magnetic circuits in each of said gates, input means for applying input signals to said input windings of each of said gates, cancellation means for normally canceling said input signals, said cancellation means including transfer means on said one pair of magnetic circuits in each of said gates and output means on at least one of said magnetic circuits in each of said gates connected to an output circuit, and means for selectively gating an input signal applied to one of said gates through other of said gates to said output circuit, said means including control means for generating sufficient flux to temporarily saturate another pair of said magnetic circuits in a selected one of said gates, said other pair of magnetic circuits including one of said magnetic circuits on which are positioned said input windings.

10. An electrical circuit comprising a plurality of gates, each of said gates including an input terminal, a control terminal, a first transformer, a second transformer, a third transformer, and a fourth transformer, each of said transformers having a first and a second winding positioned on a core of normally unsaturated magnetic material, said material having the characteristics of high initial permeability and low remanent magnetic flux, said first windings of said first and second transformers of each of said gates serially connected to each other and terminating at the input terminal thereof, means for normally substantially canceling input signals applied to said input terminal, said last-mentioned means including said second windings of said first and second transformers of each of said gates serially connected to each other in phase opposition and further serially connected to said second winding of said third transformer and said serially connected second windings of each of said gates being parallelly connected to similarly serially connected second windings of the others of said gates and said first winding of said third transformer serially connected to said first winding of said fourth transformer in each of said gates and serially connected to similarly connected first windings of said third and fourth transformers of the others of said gates and terminated at a common output terminal, and control means including a third winding on said second and said third transformers serially connected with said second winding of said fourth transformers in each of said gates to said control terminal thereof for temporarily saturating said second, said third and said fourth transformers of a selected gate to gate an associated input signal through other of said gates to said common output terminal.

11. A gate circuit comprising a plurality of groups of transformers, each of said groups of transformers including three normally unsaturated transformers, each of said transformers of each of said groups comprising a first winding and a second winding inductively disposed on a core of soft magnetic material, the first windings of at least two of said transformers in each of said groups being serially connected to each other and terminated at an independent input terminal, first cancellation means in each of said groups, said first cancellation means including the second windings of said three transformers in each of said groups connected together for normally effecting cancellation of potential induced in said second windings when said serially connected first windings thereof are energized, second cancellation means common to all of said groups, said second cancellation means comprising said first windings of the third transformer of each of said groups connected to each other to normally cause cancellation of potential induced into said serially connected second windings of any of said groups when the serially connected first windings thereof are energized, and control means for temporarily disabling said first cancellation means in a selected one of said groups and concomitantly disabling said second cancellation means to gate an input signal applied to said input terminal through other of said groups of transformers to a common output terminal.

12. A gate circuit in accordance with claim 11 wherein said control means includes two serially connected third windings in each of said groups, said third windings in each of said groups being inductively disposed on two of said three transformers thereof, and means for applying a control signal to said third windings of a selected one of said groups to temporarily saturate said last mentioned two transformers thereof.

References Cited in the file of this patent

UNITED STATES PATENTS

| | | |
|---|---|---|
| 2,666,151 | Rajchman | Jan. 12, 1954 |
| 2,781,504 | Canepa | Feb. 12, 1957 |
| 2,902,608 | Shelman | Sept. 1, 1959 |
| 2,912,677 | Ashenhurst | Nov. 10, 1959 |
| 2,920,825 | Lanning | Jan. 12, 1960 |